FIG_1
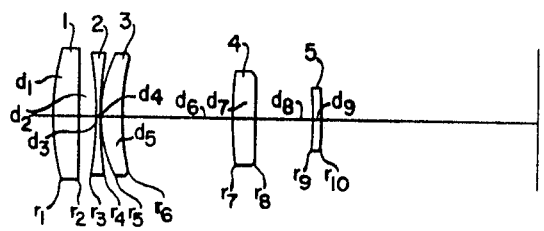
FIG_3
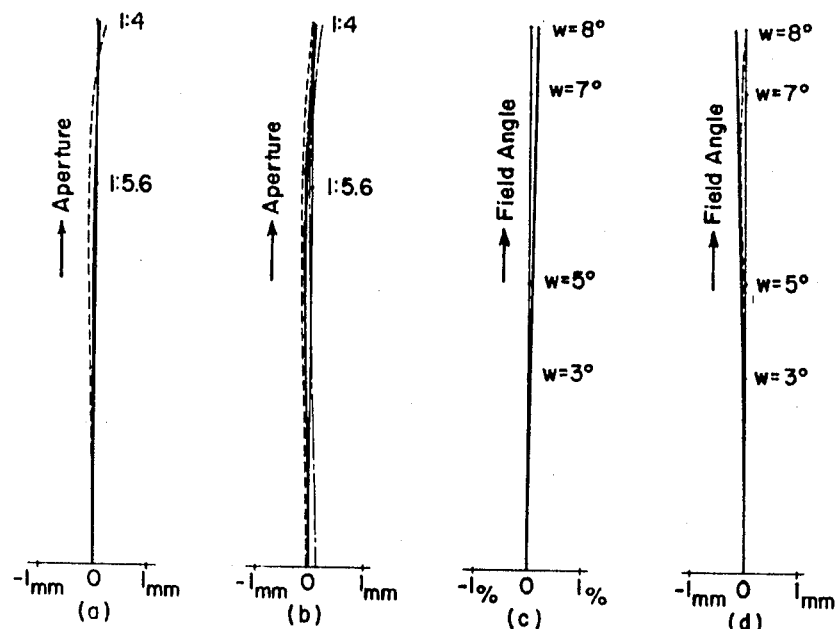

United States Patent Office 3,467,462
Patented Sept. 16, 1969

3,467,462
LENS SYSTEM OF LOW CHROMATIC ABERRATION
Tomokazu Kazamaki and Tohru Matsumoto, Itabashi-ku, Tokyo-to, Japan, assignors to Asahi Kogaku Kogyo Kabushiki Kaisha, Tokyo-to, Japan, a corporation of Japan
Filed July 9, 1965, Ser. No. 470,711
Claims priority, application Japan, Aug. 13, 1964, 39/45,432
Int. Cl. G02b 3/06, 1/10
U.S. Cl. 350—2                    3 Claims

ABSTRACT OF THE DISCLOSURE

A long focus lens system of focal length F consists of five successive lenses, the first, third and fourth lenses being positive, and the second and fifth being negative. The fourth lens front face curvature is equal to or less than aplanatic to paraxial rays emerging from the third lens and the radius of curvature of the fifth lens front face is not less than 0.12F. The first lens is undercorrected for chromatic aberration, the second lens overcorrects the first lens, the third lens undercorrects the first two lenses, the fourth lens overcorrects the first three lenses and the fifth lens corrects the first four lenses.

---

The present invention relates generally to improvements in optical systems and it relates particularly to an improved long focus lens system for use as an objective lens in photography or the like.

The conventional long focus objective lens systems employed in photography possess many drawbacks and disadvantages. They are complex expensive devices which are not only difficult to manufacture but are usually of an optical quality which leaves much to be desired. Many of the available long focus lens systems produce images of a sharpness which do not justify their use. The aberrations of long focal length photographic lens systems should be corrected to a high degree to warrant the employment of these systems. Thus, by way of example, if a long focus lens with a focal length of 150 mm. is interchanged for the standard camera lens of a focal length of 50 mm. the clarity of the image produced by the long focus lens should be equal to that produced by the standard lens. If the image clarity of the long focus lens is less than that of the standard lens such that the enlargement of the image produced by the standard lens to that of the long focus lens has the sharpness of image of the long focus lens, the long focus lens clearly serves no useful purpose and introduces many drawbacks.

It is therefore a principal object of the present invention to provide an improved optical system.

Another object of the present invention is to provide an improved long focal length lens system.

Still another object of the present invention is to provide an improved photographic long focus lens system.

A further object of the present invention is to provide a lens system of the above nature characterized by its superior optical properties including minimum chromatic and spherical aberration, distortion and astigmatism, its versatility, adaptability and low cost.

The above and other objects of the present invention will become apparent from a reading of the following description taken in conjunction with the accompanying drawings, wherein:

FIGURE 1 is a longitudinal sectional view of a long focus lens system embodying the present invention;

FIGURE 2 is a view similar to FIGURE 1 of another embodiment of the present invention;

Figure 5:
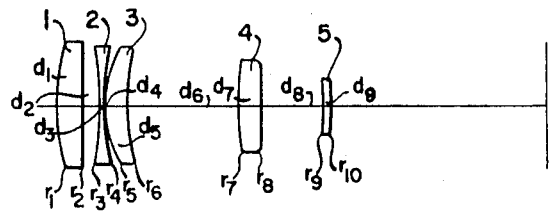

FIGURES 3(a) to 3(d) are sets of curves illustrating the spherical aberration and sine condition, the chromatic spherical aberration, the distortion, and the astigmatism of the lens system illustrated in FIGURE 1;

FIGURES 4(a) to 4(d) are sets of curves similar to FIGURES 3(a) to 3(d), respectively, for the lens system illustrated in FIGURE 2;

FIGURE 5 is a view similar to FIGURE 1 of another embodiment of the present invention; and FIGURES 6(a) to (d) are sets of curves similar to FIGURES 3(a) to 3(d), respectively, for the lens system illustrated in FIGURE 5.

In a sense the present invention contemplates the provision of a lens system comprising in succession from the front thereof, a first positive lens, a second negative lens, a third positive lens, a fourth positive lens and a fifth negative lens, said first second and third lenses being overcorrected as a group for chromatic aberration, said first, second, third and fourth lenses being undercorrected as a group for chromatic aberration and said fifth lens substantially correcting the chromatic aberration of said group of said first four lenses. Advantageously the first lens possesses an undercorrected chromatic aberration, the second lens overcorrects the chromatic aberration of the first lens, the third lens is a meniscus lens having a front face of greater curvature than the rear face thereof and effects an undercorrection of the overcorrected chromatic aberration of the first and second lenses, the fourth lens has a front face with a curvature equal to or less than that aplanatic relative to paraxial rays emerging from the rear face of the third lens resulting from rays from an infinite object incident on the lens system and overcorrecting the chromatic aberration of the first three lenses whereby the first four lenses possess undercorrected chromatic aberration, and the fifth lens substantially fully corrects the chromatic aberration of the first four lenses. It should be noted, that as compared to a triplet lens, an additional correction is made, and a high order of correction of chromatic aberration is achieved.

In long focus lens systems of the present general nature a large portion of the astigmatism due to the front lens system is corrected by the high curvature of the face of the rear negative lens necessitating that this curvature be very large (the radius of curvature of the front face of the fifth lens is very small) whereby to aggravate coma aberration. However, in accordance with the present invention, by providing the fourth lens with a font face having a curvature of a radius of curvature of such length as to be aplanatic to light rays of an infinitely distant object and issuing from the rear face of the third lens, the positive lens astigmatism due to the fourth lens can be made very small or into negative lens astigmatism so that the radius of curvature of the front face of the fifth lens can be relatively large. As a consequence while astigmatism is maintained at a very low value the coma aberration may also be made very small.

Referring now to the drawings and particularly FIGURE 1 thereof which illustrates a preferred embodiment of the present invention, the improved lens system comprises a long focus lens system including five consecutive coaxial lenses generally designated from the front to the rear thereof as 1, 2, 3, 4 and 5 respectively. The lens system has a focal length of 100 mm., a back focal length of 40.16 mm., and an aperture of 1:4, and the lenses possess the following parameters and relationships:

| | | | |
|---|---|---|---|
| $r_1=35.90$ | $d_1=5.0$ | $n_1d=1.5163$ | $\mu_1d=64.0$ |
| $r_2=-796.43$ | $d_2=3.0$ | | |
| $r_3=-117.00$ | $d_3=1.5$ | $n_2d=1.7174$ | $\mu_2d=29.5$ |
| $r_4=86.77$ | $d_4=0.2$ | | |
| $r_5=26.60$ | $d_5=4.0$ | $n_3d=1.5163$ | $\mu_3d=64.0$ |
| $r_6=46.32$ | $d_6=20.0$ | | |
| $r_7=52.00$ | $d_7=4.0$ | $n_4d=1.6034$ | $\mu_4d=38.0$ |
| $r_8=-751.74$ | $d_8=11.0$ | | |
| $r_9=18.00$ | $d_9=1.0$ | $n_5d=1.5111$ | $\mu_5d=60.5$ |
| $r_{10}=-58.21$ | | | | wherein $r_1, r_2 \ldots r_{10}$ are the radii of curvature of the corresponding subscript designated lens faces numbered consecutively from the front face of the first lens to the rear face of the fifth lens, $d_1, d_2 \ldots d_{10}$ are the coaxial distances between the corresponding subscript designated lens face and the next rearwardly successive lens face, $n_1d, n_2d \ldots n_5d$ are the indices of refraction of the corresponding subscript designated lenses, and $\mu_1d, \mu_2d \ldots \mu_5d$ are the Abbé $\mu$-values of the corresponding subscript designated lenses.

The Seidel's coefficients of the lens system specified above are as follows:

| | $S_1$ | $S_2$ | $S_3$ | P | $S_5$ |
|---|---|---|---|---|---|
| 1 | 4.853 | 1.742 | 0.625 | 0.948 | 0.565 |
| 2 | 2.185 | −1.340 | 0.822 | 0.042 | −0.530 |
| 3 | −5.546 | 2.301 | −0.954 | −0.357 | 0.544 |
| 4 | −0.075 | −0.106 | −0.149 | −0.481 | −0.889 |
| 5 | 5.869 | 2.537 | 1.097 | 1.280 | 1.027 |
| 6 | 0.090 | 0.138 | 0.213 | −0.735 | −0.803 |
| 7 | −0.012 | −0.084 | −0.570 | 0.723 | 1.038 |
| 8 | 2.388 | −0.801 | 0.268 | 0.050 | −0.106 |
| 9 | −10.123 | −3.912 | −1.511 | −1.879 | −1.310 |
| 10 | 0.821 | −0.360 | −0.158 | 0.581 | −0.324 |
| | 0.450 | 0.114 | −0.001 | 0.173 | −0.789 | where $S_{37}+S_{38}=-0.302$ ($S_{37}$ indicates the value $S_3$ for the seventh surface).

Figure 3:
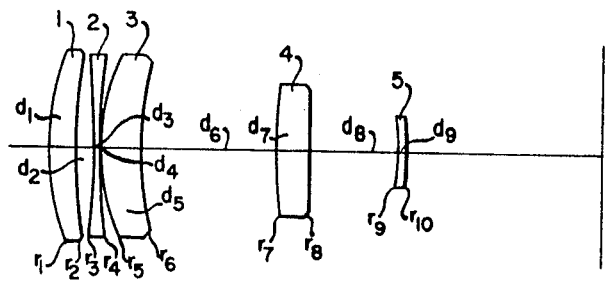

FIGURE 3 illustrates the aberration curves of the above lens system resulting from light ray tracing. It is evident from these curves that in spite of the employment of inexpensive glass and small curvatures, correction of aberration to a very high order is achieved. It should be noted that the Rayleigh limit of a 1:4 lens is 0.19 mm. The lens system may be employed with good results as a unit over a wide range of brightness and one utilizing heavy glass to one utilizing glass employed in conventional binoculars.

In FIGURE 2 of the drawings, in which the various designations correspond to those in FIGURE 1 there is illustrated another embodiment of the present invention in the form of a lens system having a focal length of 100 mm. a back focal length of 36.68 mm., an aperture of 1:2.8, the lenses possessing the following parameters and relationships:

| | | | |
|---|---|---|---|
| $r_1=47.30$ | $d_1=6.0$ | $n_1d=1.6204$ | $\mu_1d=60.3$ |
| $r_2=209.43$ | $d_2=2.2$ | | |
| $r_3=-185.00$ | $d_3=2.0$ | $n_2d=1.7408$ | $\mu_2d=27.7$ |
| $r_4=152.36$ | $d_4=0.2$ | | |
| $r_5=40.00$ | $d_5=7.0$ | $n_3d=1.6204$ | $\mu_3d=60.3$ |
| $r_6=56.21$ | $d_6=25.0$ | | |
| $r_7=55.00$ | $d_7=6.0$ | $n_4d=1.6204$ | $\mu_4d=60.3$ |
| $r_8=-999.21$ | $d_8=16.3$ | | |
| $r_9=-24.87$ | $d_9=2.0$ | $n_5d=1.5119$ | $\mu_5d=58.2$ |
| $r_{10}=-68.31$ | | | |

The Seidel's coefficients of this objective are as follows:

| | $S_1$ | $S_2$ | $S_3$ | P | $S_5$ |
|---|---|---|---|---|---|
| 1 | 2.232 | 1.056 | 0.499 | 0.809 | 0.619 |
| 2 | 0.167 | −0.298 | 0.533 | −0.182 | −0.627 |
| 3 | −1.771 | 1.131 | −0.723 | −0.230 | 0.609 |
| 4 | −0.001 | −0.002 | −0.008 | −0.279 | −0.812 |
| 5 | 1.667 | 0.998 | 0.597 | 0.957 | 0.931 |
| 6 | 0.042 | 0.067 | 0.106 | −0.681 | −0.909 |
| 7 | −0.026 | −0.090 | −0.307 | 0.696 | 1.313 |
| 8 | 1.429 | −0.531 | 0.197 | 0.038 | −0.087 |
| 9 | −4.043 | −1.919 | −0.911 | −1.361 | −1.079 |
| 10 | 0.591 | −0.190 | 0.061 | 0.495 | −0.179 |
| | 0.288 | 0.219 | 0.047 | 0.261 | −0.222 | where $S_{37}+S_{38}=-0.110$ ($S_{37}$ indicates the value $S_3$ for the seventh surface).

Figure 4:
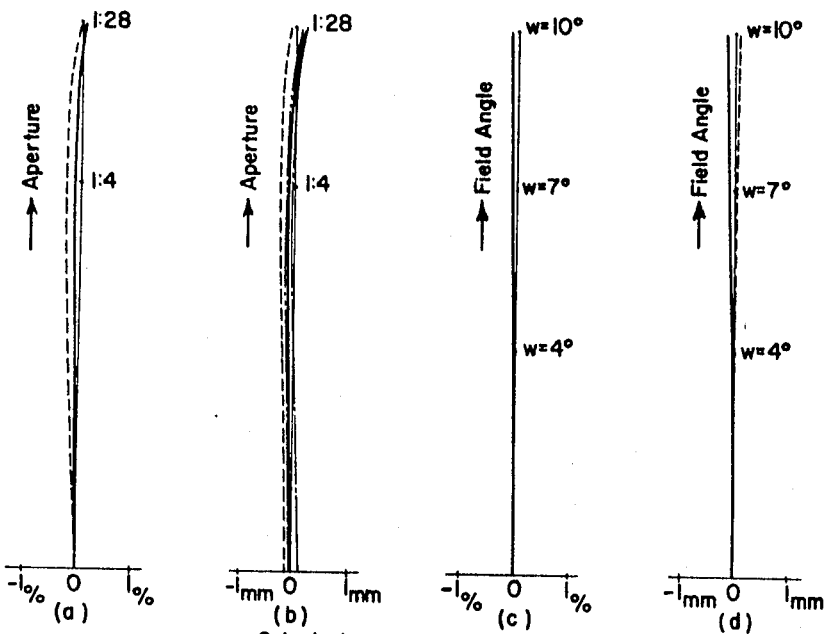

The aberration curves of the lens system last described are illustrated in FIGURE 4 and indicate excellent optical characteristics. The Rayleigh limit of a 1:2.8 lens is 0.085 mm. It should be noted that the spherical aberration of the above lens system is less than one fifth that of a 1:28 Tessar type lens.

In FIGURE 5 of the drawings there is illustrated still another lens system embodying the present invention in which the various designations correspond to those of FIGURE 1. This lens system has a focal length of 100 mm., a back focal length of 33.52 mm. and an aperture of 1:4.5, and the lenses possess the following parameters and relationships:

| | | | |
|---|---|---|---|
| $r_1=40.000$ | $d_1=5.00$ | $n_1=1.4339$ | $\nu_1=94.7$ |
| $r_2=-193.927$ | $d_2=3.00$ | | |
| $r_3=-82.000$ | $d_3=1.50$ | $n_2=1.6200$ | $\nu_2=36.3$ |
| $r_4=188.429$ | $d_4=0.20$ | | |
| $r_5=30.000$ | $d_5=4.00$ | $n_3=1.4339$ | $\nu_3=94.7$ |
| $r_6=60.389$ | $d_6=25.00$ | | |
| $r_7=49.400$ | $d_7=4.00$ | $n_4=1.5601$ | $\nu_4=47.0$ |
| $r_8=-340.221$ | $d_8=13.20$ | | |
| $r_9=20.280$ | $d_9=1.00$ | $n_5=1.5891$ | $\nu_5=61.2$ |
| $r_{10}=-104.691$ | | | |

It should be noted that the first and the third lenses are formed of fluorite.

The Seidel's coefficients of this objective are as follows:

|   | $S_1$ | $S_2$ | $S_3$ | P | $S_5$ |
|---|---|---|---|---|---|
| 1 | 3.297 | 1.318 | 0.527 | 0.756 | 0.513 |
| 2 | 2.379 | −1.300 | 0.705 | 0.156 | −0.467 |
| 3 | −5.816 | 2.189 | −0.824 | −0.466 | 0.486 |
| 4 | 0.002 | 0.013 | 0.079 | −0.203 | −0.732 |
| 5 | 3.421 | 1.638 | 0.784 | 1.008 | 0.858 |
| 6 | 0.035 | 0.096 | 0.262 | −0.501 | −0.646 |
| 7 | −0.012 | −0.084 | −0.575 | 0.726 | 1.027 |
| 8 | 2.465 | −0.560 | 0.127 | 0.105 | −0.053 |
| 9 | −6.087 | −2.905 | −1.386 | −1.828 | −1.534 |
| 10 | 0.396 | −0.349 | 0.308 | 0.354 | −0.584 |
|   | 0.100 | 0.056 | 0.007 | 0.108 | −1.132 | where $S_{37}+S_{38}=-0.448$ ($S_{37}$ indicates the value $S_3$ for the seventh surface).

Figure 6:
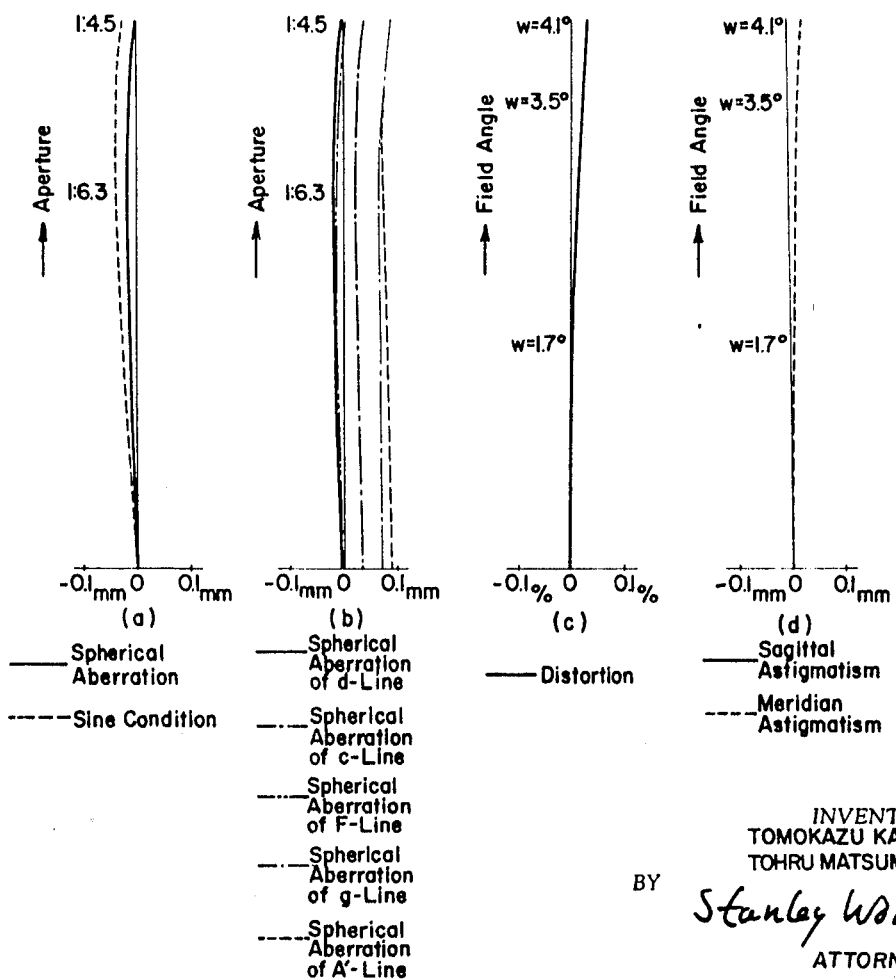

The aberration curves of the lens system last described resulting from the tracing of rays is illustrated in FIGURE 6. As can be seen in FIGURE 6(b) the lens system is of such high quality that the residual chromatic aberration is exceedingly small and that even with a very long focal length no correction is required for infrared photography (A' line) and the spherical aberration is within the Rayleigh limit (0.24 mm. in the case of 1:4.5).

While there have been described and illustrated preferred embodiments of the present invention it is apparent that numerous alterations omissions and additions may be made without departing from the spirit thereof.

What is claimed is:

1. A lens system of focal length F comprising five successive lenses having substantially the following parameters and relationships:

| | | | |
|---|---|---|---|
| $r_1=0.4730F$ | $d_1=.060F$ | $n_1d=1.6204$ | $\nu_1d=60.3$ |
| $r_2=2.0943F$ | $d_2=.022F$ | | |
| $r_3=-1.8500F$ | $d_3=.020F$ | $n_2d=1.7408$ | $\nu_2d=27.7$ |
| $r_4=1.5236F$ | $d_4=.002F$ | | |
| $r_5=0.4000F$ | $d_5=.070F$ | $n_3d=1.6204$ | $\nu_3d=60.3$ |
| $r_6=0.5621F$ | $d_6=0.250F$ | | |
| $r_7=0.5500F$ | $d_7=.060F$ | $n_4d=1.6204$ | $\nu_4d=60.3$ |
| $r_8=-9.9921F$ | $d_8=0.163F$ | | |
| $r_9=-0.2487F$ | $d_9=.020F$ | $n_5d=1.5119$ | $\nu_5d=58.2$ |
| $r_{10}=-0.6831F$ | | | | wherein said lenses are identified consecutively as the first to the fifth lens and having faces designated from front to rear as the first to the tenth face, $r_n$ is the radius of curvature of the corresponding subscript designated face, $d_n$ is the axial distance between the corresponding subscript designated face and the next rearwardly successive face, $n_nd$ is the index of refraction of the corresponding subscript designated lens, and $\nu_nd$ is the Abbe $\nu$-value of the corresponding subscript designated lens.

2. A lens system of focal length F comprising five successive lenses having substantially the following parameters and relationships:

| | | | |
|---|---|---|---|
| $r_1=0.3590F$ | $d_1=.050F$ | $n_1d=1.5163$ | $\nu_1d=64.0$ |
| $r_2=-7.9643F$ | $d_2=.030F$ | | |
| $r_3=1.1700F$ | $d_3=.015F$ | $n_2d=1.7174$ | $\nu_2d=29.5$ |
| $r_4=0.8677F$ | $d_4=.002F$ | | |
| $r_5=0.2660F$ | $d_5=.040F$ | $n_3d=1.5163$ | $\nu_3d=64.0$ |
| $r_6=0.4632F$ | $d_6=0.200F$ | | |
| $r_7=0.5200F$ | $d_7=.040F$ | $n_4d=1.6034$ | $\nu_4d=38.0$ |
| $r_8=-7.5174F$ | $d_8=0.110F$ | | |
| $r_9=-0.1800F$ | $d_9=.010F$ | $n_5d=1.5111$ | $\nu_5d=60.5$ |
| $r_{10}=-0.5821F$ | | | | wherein said lenses are identified consecutively as the first to the fifth lens and having faces designated from front to rear as the first to the tenth face, $r_n$ is the radius of curvature of the corresponding subscript designated face, $d_n$ is the axial distance between the corresponding subscript designated face and the next rearwardly successive face, $n_nd$ is the index of refraction of the corresponding subscript designated lens, and $\nu_nd$ is the Abbe $\nu$-value of the corresponding subscript designated lens.

3. A lens system of focal length F comprising five successive lenses having substantially the following parameters and relationships:

| | | | |
|---|---|---|---|
| $r_1=0.40000F$ | $d_1=.0500F$ | $n_1d=1.4339$ | $\nu_1d=94.7$ |
| $r_2=-1.93927F$ | $d_2=.0300F$ | | |
| $r_3=-0.82000F$ | $d_3=.0150F$ | $n_2d=1.6200$ | $\nu_2d=36.3$ |
| $r_4=1.88429F$ | $d_4=.0020F$ | | |
| $r_5=0.30000F$ | $d_5=.0400F$ | $n_3d=1.4339$ | $\nu_3d=94.7$ |
| $r_6=0.60389F$ | $d_6=.02500F$ | | |
| $r_7=0.49400F$ | $d_7=.0400F$ | $n_4d=1.5601$ | $\nu_4d=47.0$ |
| $r_8=-3.40221F$ | $d_8=0.1320F$ | | |
| $r_9=-0.20280F$ | $d_9=.0100F$ | $n_5d=1.5891$ | $\nu_5d=61.2$ |
| $r_{10}=-1.04691F$ | | | | wherein said lenses are identified consecutively as the first to the fifth lens and having faces designated from front to rear as the first to the tenth face, $r_n$ is the radius of curvature of the corresponding subscript designated face, $d_n$ is the axial distance between the corresponding subscript designated face and the next rearwardly successive face, $n_nd$ is the index of refraction of the corresponding subscript designated lens, and $\nu_nd$ is the Abbe $\nu$-value of the corresponding subscript designated lens.

References Cited

UNITED STATES PATENTS 2,487,873  11/1949  Herzberger et al. __ 350—226 X
3,320,016  5/1967  Van Graafeiland ____ 350—215

JOHN K. CORBIN, Primary Examiner

U.S. Cl. X.R.

350—177, 216